United States Patent
Nelsen et al.

(10) Patent No.: US 9,621,426 B1
(45) Date of Patent: Apr. 11, 2017

(54) SWITCHING FACILITY HAVING A CONTROL PANEL WITH RELEGENDABLE BUTTONS

(75) Inventors: Mark E. Nelsen, Grass Valley, CA (US); Kieran J. Lyons, Big Oak Valley, CA (US); Thomas B. Crabb, Grass Valley, CA (US); Gary M. Waters, Grass Valley, CA (US)

(73) Assignee: GRASS VALLEY USA, LLC, Grass Valley, CA (US)

( * ) Notice: Subject to any disclaimer, the term of this patent is extended or adjusted under 35 U.S.C. 154(b) by 1774 days.

(21) Appl. No.: 12/104,596

(22) Filed: Apr. 17, 2008

Related U.S. Application Data

(60) Provisional application No. 60/925,273, filed on Apr. 18, 2007.

(51) Int. Cl.
*H04L 12/24* (2006.01)
*G06F 3/023* (2006.01)

(52) U.S. Cl.
CPC ............ *H04L 41/12* (2013.01); *G06F 3/0238* (2013.01); *H04L 41/22* (2013.01)

(58) Field of Classification Search
None
See application file for complete search history.

(56) References Cited

U.S. PATENT DOCUMENTS

| | | | |
|---|---|---|---|
| 5,237,327 A * | 8/1993 | Saitoh | H04B 1/202 200/5 A |
| 5,432,777 A | 7/1995 | Le Boudec et al. | |
| 5,515,045 A * | 5/1996 | Tak | H03K 17/969 341/22 |
| 5,517,497 A | 5/1996 | Le Boudec et al. | |
| 5,737,595 A | 4/1998 | Cohen et al. | |
| 5,999,179 A * | 12/1999 | Kekic | H04L 41/0213 715/734 |
| 6,138,161 A | 10/2000 | Reynolds et al. | |
| 6,295,647 B1 * | 9/2001 | Ramaswamy | H04N 21/235 348/E5.006 |
| 6,388,642 B1 * | 5/2002 | Cotis | G06F 3/0489 345/33 |
| 6,392,640 B1 * | 5/2002 | Will | G06F 1/1626 345/184 |
| 6,757,372 B1 * | 6/2004 | Dunlap | H04M 1/2477 455/566 |
| 6,853,841 B1 * | 2/2005 | St. Pierre | H04L 12/2805 455/345 |

(Continued)

*Primary Examiner* — Chirag Shah
*Assistant Examiner* — Joshua Smith
(74) *Attorney, Agent, or Firm* — Daniel Rose; Foley & Lardner LLP

(57) ABSTRACT

A switching facility has a plurality of input ports for connection to signal sources in multiple categories, each category having multiple members, a plurality of output ports for connection to signal destinations in multiple categories, each category having multiple members, and a switch fabric configurable by a control system to connect any selected input port to any unique group of one or more output ports. A control panel interacts with the control system and has a plurality of actuatable elements and a display area associated with each actuatable element for displaying a legend associated with the actuatable element. The control system is functionally connected to the control panel and is operative to change the legend associated with an actuatable element.

16 Claims, 5 Drawing Sheets

(56) References Cited

U.S. PATENT DOCUMENTS

| | | | | |
|---|---|---|---|---|
| 6,961,048 | B2* | 11/2005 | Mitchell | G06F 3/0238 345/168 |
| 7,075,940 | B1 | 7/2006 | Finkelstein et al. | |
| 7,078,608 | B2 | 7/2006 | Aiso et al. | |
| 7,107,332 | B2 | 9/2006 | Murotani et al. | |
| 7,185,075 | B1* | 2/2007 | Mishra et al. | 709/223 |
| 7,248,168 | B2 | 7/2007 | Muehl et al. | |
| 7,277,117 | B2* | 10/2007 | Takashima | H04L 67/04 370/260 |
| 7,290,218 | B2 | 10/2007 | Hawkins | |
| 7,523,187 | B1* | 4/2009 | Lavallee et al. | 709/223 |
| 7,526,568 | B1 | 4/2009 | Swanton et al. | |
| 8,019,806 | B2* | 9/2011 | Grace et al. | 709/223 |
| 8,307,307 | B2* | 11/2012 | Wilson | H04M 1/7258 709/206 |
| 2002/0002039 | A1* | 1/2002 | Qureshey | H04L 12/2812 455/344 |
| 2003/0061167 | A1 | 3/2003 | Mann et al. | |
| 2004/0036662 | A1* | 2/2004 | Sakumura | G09G 5/14 345/1.3 |
| 2004/0059816 | A1* | 3/2004 | Takaoka et al. | 709/224 |
| 2004/0104928 | A1* | 6/2004 | Morioka | H04L 12/24 715/736 |
| 2004/0264484 | A1* | 12/2004 | Kui et al. | 370/402 |
| 2005/0044275 | A1* | 2/2005 | Adamson | H04L 41/00 709/253 |
| 2005/0060409 | A1* | 3/2005 | Dube | H04L 29/06 709/226 |
| 2005/0110762 | A1* | 5/2005 | Muyskens | G06F 3/0238 345/170 |
| 2005/0267961 | A1* | 12/2005 | Pirbhai | H04L 41/0663 709/223 |
| 2006/0126521 | A1* | 6/2006 | Hyndman | H04L 41/12 370/248 |
| 2006/0239248 | A1* | 10/2006 | Hawk | H04L 67/36 370/352 |
| 2007/0127734 | A1 | 6/2007 | Brulle-Drews | |
| 2007/0291007 | A1* | 12/2007 | Forlines | G06F 3/0488 345/173 |
| 2008/0131184 | A1* | 6/2008 | Brown | G06F 3/0238 400/490 |
| 2009/0049022 | A1 | 2/2009 | Bender et al. | |

* cited by examiner

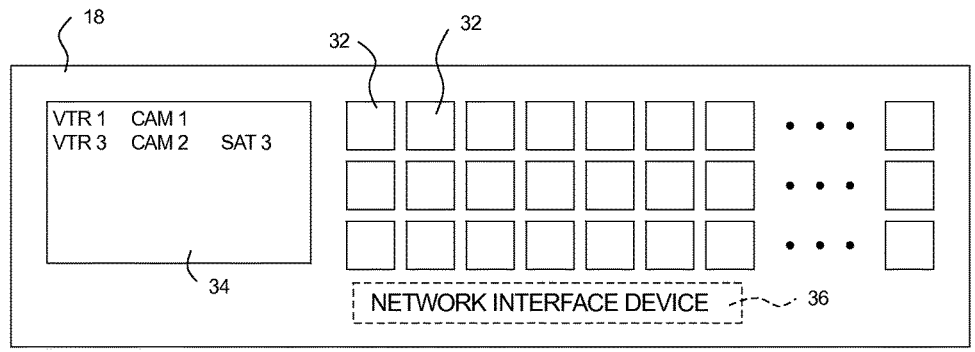
FIG. 3
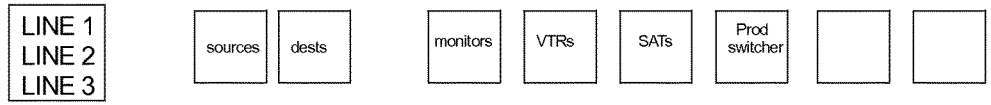
FIG. 4  FIG. 5
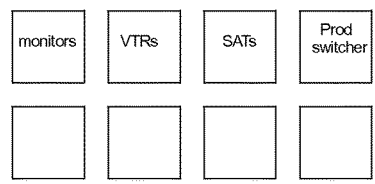
FIG. 6
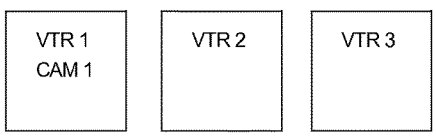
FIG. 7
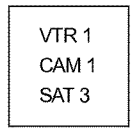 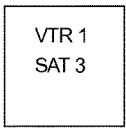
FIG. 8  FIG. 9

SWITCHING FACILITY HAVING A CONTROL PANEL WITH RELEGENDABLE BUTTONS

CROSS-REFERENCE TO RELATED APPLICATION

This application claims benefit of U.S. Provisional Application No. 60/925,273 filed Apr. 18, 2007, the entire disclosure of which is hereby incorporated by reference herein for all purposes.

BACKGROUND OF THE INVENTION

This invention relates to a switching facility having a control panel with relegendable buttons.

SUMMARY OF THE INVENTION

In accordance with the invention there is provided a switching facility having a plurality of input ports for connection to signal sources, the signal sources having multiple categories and each category having multiple members, a plurality of output ports for connection to signal destinations, the signal destinations having multiple categories and each category having multiple members, a connection means configurable to connect any selected input port to any unique group of one or more output ports, a control system for controlling the configuration of the connection means, and a control panel for interacting with the control system and having a plurality of actuatable elements and a display area associated with each actuatable element for displaying a legend associated with the actuatable element, and wherein the control system is functionally connected to the control panel and is operative to change the legend associated with an actuatable element such that in an initial state of the switching facility the display area associated with a first actuatable element displays a legend associated with input ports of the facility and the display area associated with a second actuatable element displays a legend associated with output ports of the facility, and upon actuating the first element when the facility is in the initial state, the control system causes the facility to change to a second state in which the display areas associated with a first group of actuatable elements display respective legends associated with categories of input ports and upon actuating the second element when the facility is in the initial state, the control system causes the facility to change to a third state in which the display areas associated with a second group of actuatable elements display respective legends associated with categories of output ports.

BRIEF DESCRIPTION OF THE DRAWINGS

For a better understanding of the invention, and to show how the same may be carried into effect, reference will now be made, by way of example, to the accompanying drawings, in which:

FIG. 3 illustrates a router control panel, FIG. 4 illustrate one button of the router control panel, FIG. 5 illustrates two buttons of the router control panel in an initial state of the router, FIG. 6 illustrates several buttons of the router control panel in a subsequent state of the router, FIGS. 7-9 illustrate buttons of the control panel in successive states of the router.

DETAILED DESCRIPTION

Figure 1:
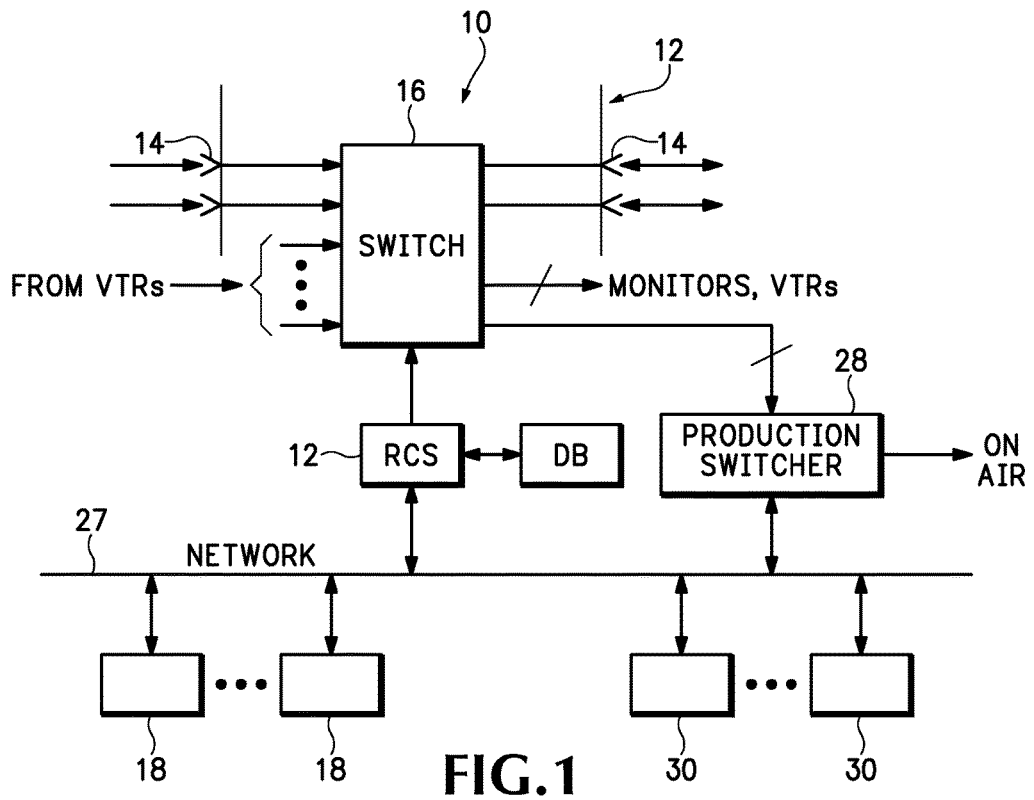
FIG. 1 is a schematic illustration of a video production truck.

FIG. 1 illustrates schematically a video router 10 that might be installed in a television production truck 12 for establishing and modifying connections among resources that are connected to the router. The resources are in two categories, namely sources and destinations, although some resources may be a source in one mode of operation and a destination in another mode. Some of the resources are located within the truck and others are located outside the truck. The truck may have several spigots 14 for connection to resources, such as cameras, outside the truck and may be equipped internally with resources such as storage devices (VTRs and disk storage devices) and display monitors.

The router 10 comprises a switch 16 that may have several hundred input ports and several hundred output ports and is operable to connect any one input port selectively to any unique group of one or more output ports in response to control signals received from a router control system (RCS) 12. The router control system controls the configuration of the router, i.e. the pattern of connections established by the switch.

Figure 2:
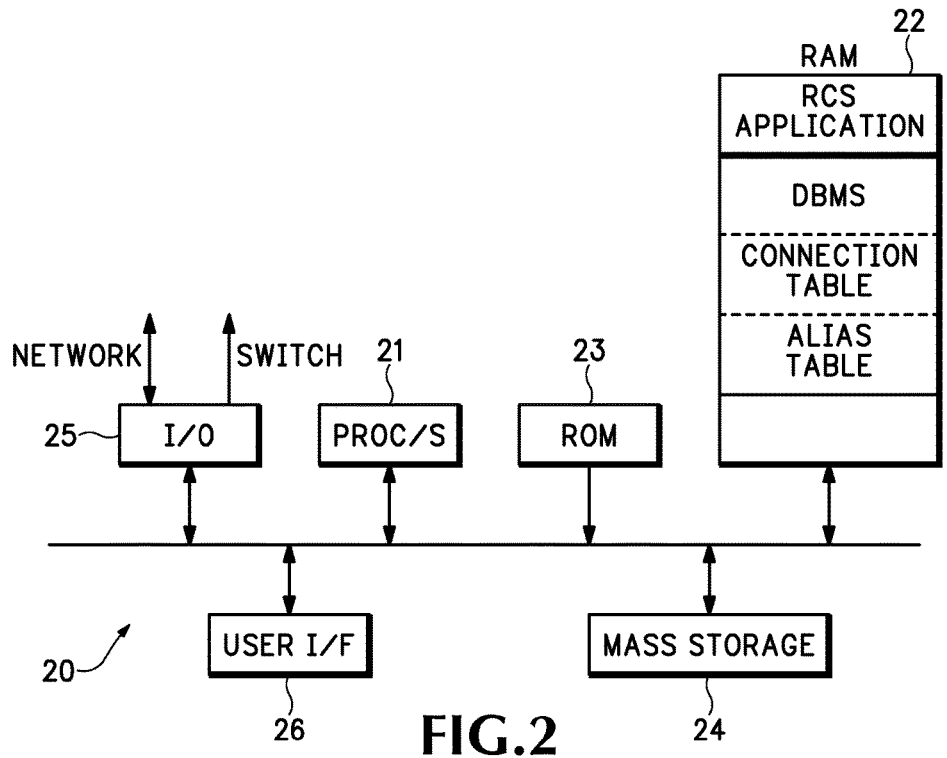
FIG. 2 illustrates schematically a computing machine that may be used in a switching facility embodying the present invention.

The router control system may be implemented by a software application running on a computing machine 20 of generally conventional topology, as shown in FIG. 2. The computing machine may comprise one or more processors 21, random access memory 22, read-only memory 23, mass storage (such as hard disk drives) 24, I/O devices 25, and a user interface 26. The mass storage 24 stores the RCS application software, which is loaded into the RAM for execution by the processor(s) 21. Commands for changing the patterns of connections established by the switch 16 are output through the I/O devices 25. The I/O devices include a network interface device for communicating with an Ethernet network 27.

Within each category of resources, there may be multiple categories of devices and within each category of devices there may be multiple devices. For example, with respect to sources, the categories of devices may include cameras and VTRs and the devices in the cameras category may be camera 1, camera 2, etc. It is sufficient in many cases to have just three levels in the hierarchy of resources (devices, categories of devices, and categories of resources) but it may in particular cases be desirable to have at least one additional level in the hierarchy.

The router is provided with several router control panels 18 that are used by operators to control the configuration of the router by issuing commands to the router control system. The commands are communicated to the router control system over the network 27, which also communicates messages from the router control system to the control panels.

The router also includes a database management system (DBMS) that runs on the same computing machine as the RCS and communicates with the RCS. The database management system maintains at least one table that defines the current configuration of the router by reference to the connections made by the router. For example if output port 2 and output port 5 are both connected to input port 1, the table includes a record associated with output port 2 reflecting a connection to input port 1 and also includes a record associated with output port 5 reflecting a connection to input port 1. The DBMS may also maintain a table containing a set of user-specified aliases, i.e. alternative names or mnemonics assigned to the input ports and output ports and typically referring to the resources connected to the input and output ports. If input port 1 is connected to a camera, arbitrarily designated camera 3, output port 2 is connected to VTR 4 and output port 5 is connected to satellite feed 7, the alias table may associate (directly or indirectly) input port 1 with the mnemonic CAM 3, output port 2 with the mnemonic VTR 4 and output port 5 with the mnemonic SAT 7 respectively.

The user-specified aliases are used in the operator interface of the router to identify the truck resources. When an operator uses a control panel to command the router to establish a connection between VTR 4 and CAM 3, the router control system uses the DBMS to translate the operator's instruction into a command to connect output port 2 to input port 1. The RCS utilizes this command to configure the router to make the appropriate connection and updates the connection table accordingly.

The truck may also contain a production switcher 28 having several input ports, some of which are connected to respective output ports of the router 10. It will be understood by those skilled in the art that the router configuration is set up in advance of a broadcast and does not normally change during the broadcast, whereas the production switcher is used during the broadcast to connect the switcher input ports selectively to an on-air output port in a sequence determined by a technical director (TD) in order to produce a television program for distribution. The technical director and other production personnel issue commands to the production switcher using switcher control panels 30, which are also connected to the network 27 for communicating messages between the production switcher and the switcher control panels.

FIG. 3 illustrates a router control panel 18 in greater detail. The operator uses this control panel to view the current configuration of the router and change the configuration as necessary in preparation for the next broadcast by connecting output ports of the switch 16 to the proper inputs. The control panel includes three rows of relegendable buttons 32. Each button can be illuminated selectively in one of at least three colors, by selective energization of suitable LEDs built into the button, and each button can also display up to three lines of text, each containing up to 8 characters (FIG. 4). Each button controls a single switch (not shown). Each time the button is pressed, the condition of the switch (conductive or non-conductive) changes. When the switch is conductive, the button is considered to be depressed; when the switch is non-conductive, the switch is considered to be non-depressed. Such relegendable buttons are commercially available.

The control panel 18 also includes a status display panel 34 that is capable of displaying several rows of text characters.

A network interface device 36 in the control panel receives messages from the RCS over the network specifying the characters to be displayed in the three lines of text in each button. Such messages may be in the form of a PRINT command containing the arguments (control panel ID, button ID, line number, text). The network interface device 36 also receives messages from the RCS for controlling the illumination color of the button (purple, green, etc.) and the illumination status of the button (high tally, low tally or not illuminated) and transmits messages to the RCS regarding the status of each button (depressed or non-depressed).

The network interface device 36 receives messages from the RCS specifying the text to be displayed in each row of the status display panel. These messages allow the status display panel to display information regarding the current configuration of the router, i.e., for each connection established by the router, the display panel shows the signal destination and the signal source of that connection. The first line of the display shown in FIG. 3 indicates that VTR 1 is currently connected to camera 1. The second line indicates that VTR 3 is currently connected to camera 2 and will be connected to satellite 3 on the next take (to be discussed below).

Let us assume that the router has input ports connected to three different categories of video signal source, e.g. cameras, VTRs, and feeds from satellites, and that there are four sources (CAM 1, CAM 2, CAM 3 and CAM 4) in the cameras category and three sources (VTR 1, VTR 2 and VTR 3) in the VTRs category. Router output ports are connected to four categories of destination, e.g. monitors, VTRs, feeds to satellites, and production switcher input ports. Cameras 1 and 2 are connected to input ports 1 and 2 respectively and VTR 1 (operating as a destination) is connected to output port 1.

Figure 10A:
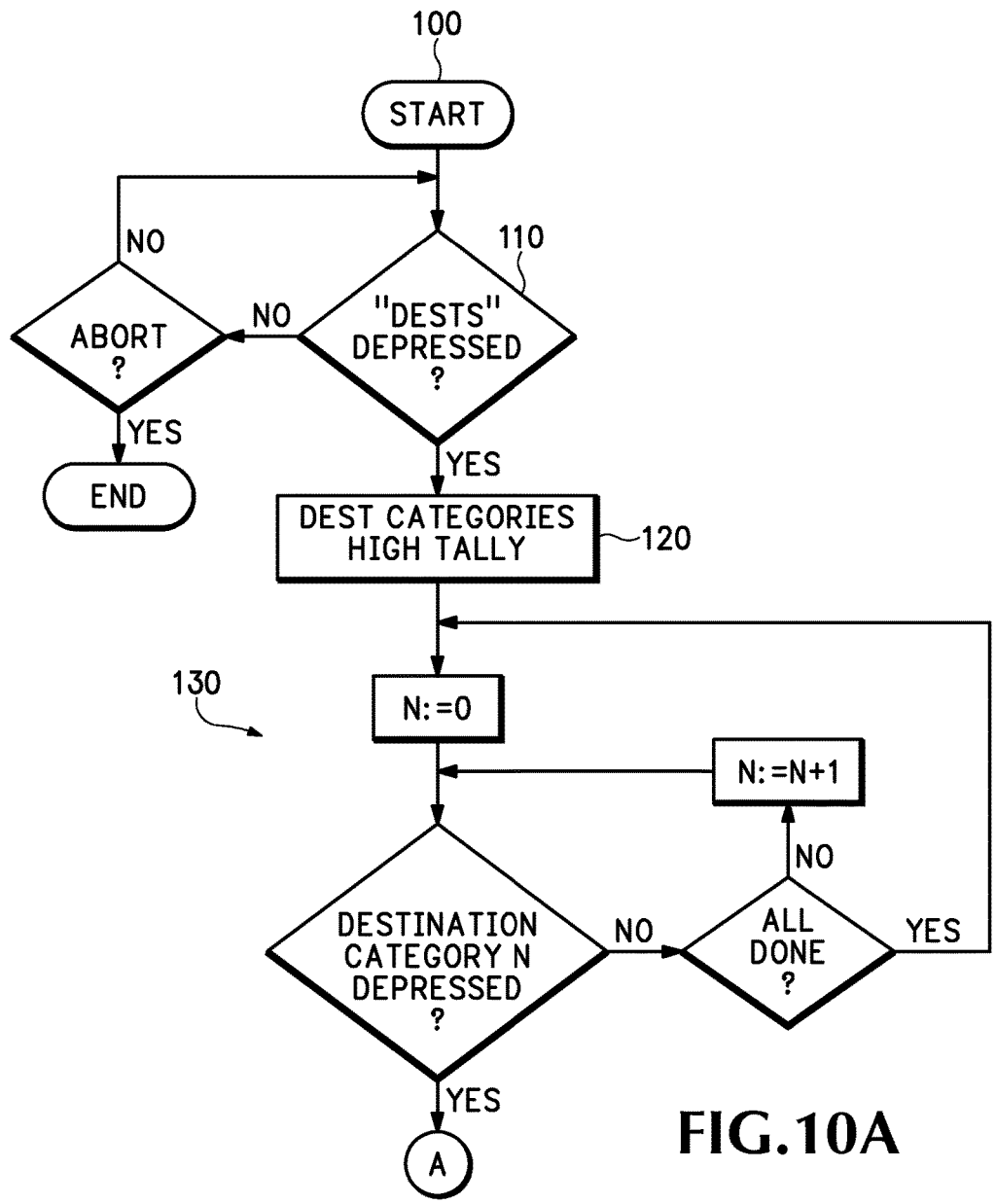
FIG. 10 is a flow chart illustrating steps in an algorithm that may be used to operate the video router.
Figure 10B:
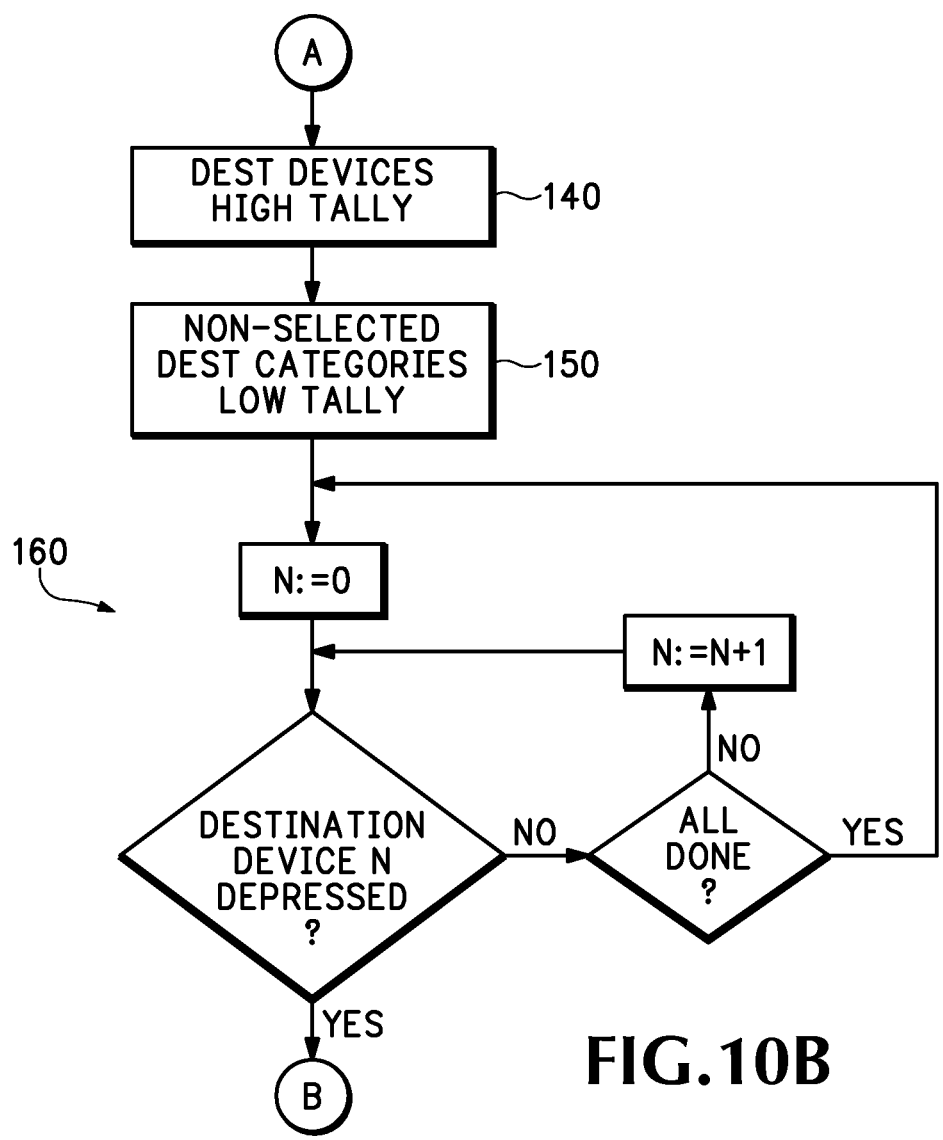
Figure 10C:
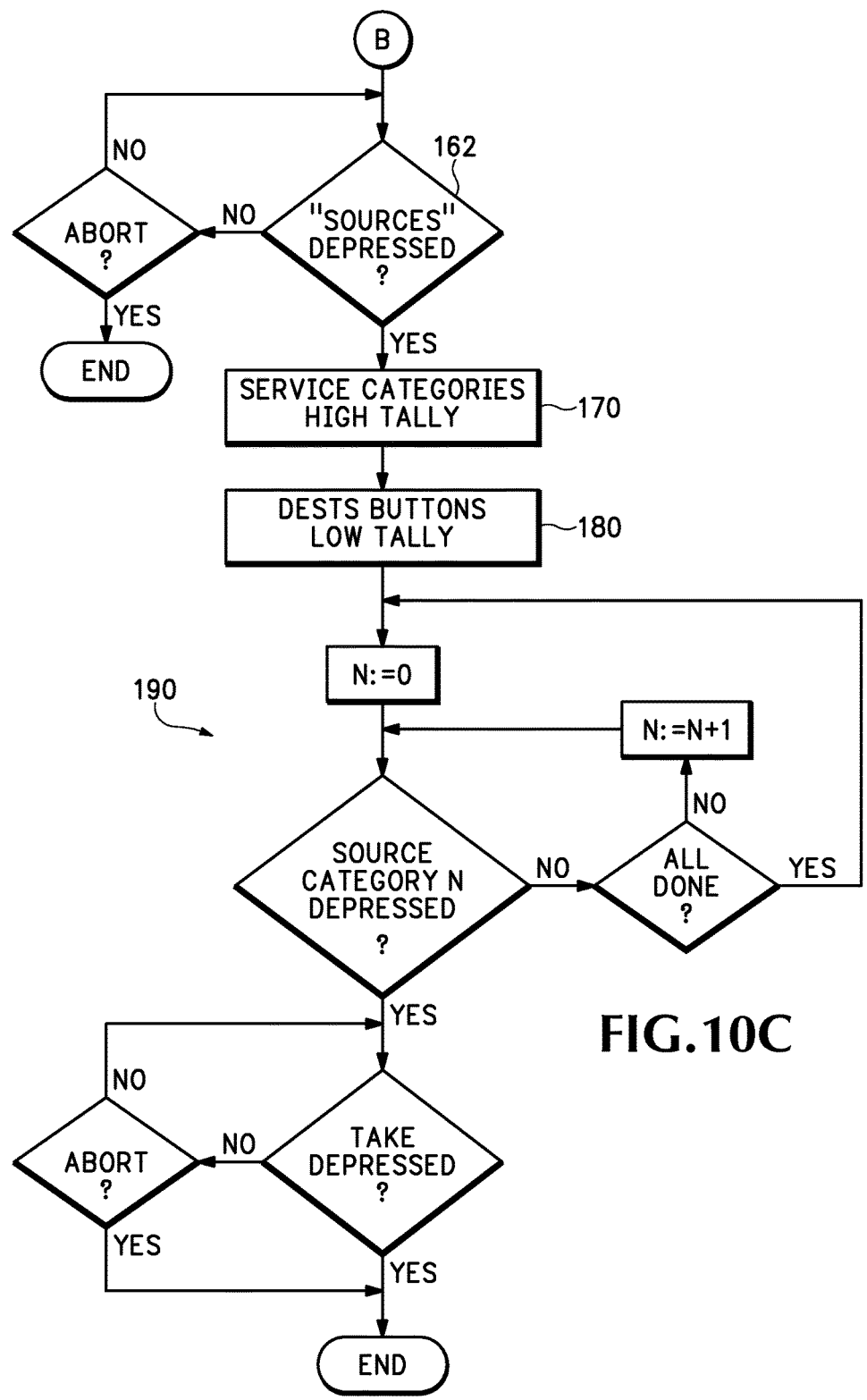

The router control system application is used to change the legends displayed by the buttons to facilitate use of the control panel. One possible algorithm for implementing this functionality is illustrated in FIG. 10. It will be appreciated that FIG. 10 illustrates the algorithm at a high level and omits routine steps that would be desirable for a robust implementation.

The router control system application allows the router control system to change dynamically the function of each button (what happens when the button changes from a non-depressed status to a depressed status) and to change the appearance of each button (whether it is illuminated or not, the color and level of illumination and the text displayed on the button). A high level of illumination, or high tally, indicates that a button is active and that the router is working against the resources selected by that button whereas a low level of illumination, or low tally, indicates that a button is active but that the router is not working against the resources selected by that button.

Let us assume an initial state (100) in which the router control system sends messages to the control panel to illuminate two buttons in purple at high tally and to display the legends "sources" and "dests" (for destinations), as shown in FIG. 5. Neither button has yet been depressed. The RCS repeatedly checks the "dests" button (step 110) to determine whether the button has been depressed. If the operator then presses the "dests" button, the network interface device 36 transmits a message to the RCS advising of the change in status of the "dests" button and the RCS responds by transmitting messages to the control panel to illuminate four buttons in green at high tally containing respectively, legends denoting the different categories of destinations, i.e. monitors, VTRs, satellites, and production switcher, as shown in FIG. 6 (step 120). The four buttons that are now illuminated in green at high tally generally will not include the "dests" button, which remains illuminated in purple at high tally, indicating that the button is active and that the control panel is working against the destination resources, or the "sources" button, which is illuminated at low tally. The RCS then cycles through the destination category buttons until it detects that one of them has been depressed (130). When the RCS detects that a destination category button (e.g. VTRs) has been depressed, it issues commands to the control panel causing the control panel to illuminate at high tally buttons for the members of the selected destination category (step 140) and to change the illumination level of the non-selected destination category buttons to low tally (step 150). For example, if the operator had pressed the "VTRs" button, three buttons would be illuminated in green at high tally and contain the legends VTR 1, VTR 2, and VTR 3 respectively (FIG. 7). The buttons may be three of the four buttons that were previously illuminated as destination categories but this need not be the case. In any event, the destination category buttons (monitors, VTRs, satellites, production switcher) are no longer available as such. The RCS also queries the database to determine the sources that are currently connected to the VTRs respectively and provides messages to the control panel so that the legend in each VTR button indicates the name of the source that is currently routed to that VTR. For example, if the router is currently configured to connect input port 1 to output port 1, the legend in the button associated with VTR 1 (which is the alias assigned to output port 1) will contain VTR 1 in line 1 and CAM 1 (the alias assigned to input port 1) in line 2. Line 3 is blank, which indicates that a change in source has not been defined for VTR 1. Assume that the operator pressed the button associated with VTR 1. The RCS cycles through the buttons for the devices in the selected destination category until it detects that the VTR 1 button has been depressed (160).

When the operator has selected a destination device, the "sources" button changes to high tally and the operator may either press the "dests" button and navigate to select another destination device (e.g. a monitor) or press the "sources" button and navigate to select a source device. Suppose that the operator wishes to change the source that is connected to VTR 1 from camera 1 to satellite 3 (which is connected to input port 4). The operator commences selectin of the source that is to be connected to that VTR 1 on the next take by pressing the "sources" button (162) which, it will be recalled, is illuminated at low tally. The "sources" button changes to high tally (170) and any buttons that contain destination oriented legends change to low tally (180). The operator navigates through the menu tree from the "sources" button and may select satellite 3 as the next source. The RCS updates the legend in the VTR 1 button to display SAT 3 in line 3. When a new source has been selected (190), the RCS causes the control panel to illuminate at high tally a button that displays the legend "Take." When the operator presses the "Take" button, the RCS reconfigures the router to break the connection of input port 1 to output port 1 and to establish a new connection between the input port 4 and output port 1, and updates the connection table accordingly. Line 2 of the legend in the VTR 1 button changes to SAT 3 and line 3 goes blank.

Another example is more pertinent to a control panel that is used as a production switcher control panel 26. Consider, for example, a broadcast of a golf tournament. In this case, there would typically be fixed cameras at each of the 18 holes and an entourage of mobile cameras following each of the major competitors. When an operator selects "sources" and then "cameras," buttons are illuminated for fixed cameras and mobile cameras respectively. The fixed and mobile groups form an intermediate level in the navigation hierarchy. If the operator presses "mobile," buttons displaying the names of the major players are illuminated and on pressing one of those buttons the operator is presented with buttons for the mobile cameras in that player's entourage. If, instead of pressing the "mobile" button the operator had pressed "fixed," buttons for the 18 holes respectively would be illuminated and on pressing "18" buttons for only the fixed cameras at hole 18 would be illuminated. Suppose that the player in first place is at hole 18. The RCS (which also interfaces with the production switcher) is programmed so that after pressing "fixed" and navigating to the fixed cameras at a selected hole, the "mobile" button remains available. The operator may press "mobile" and view buttons displaying the names of the major competitors and press the button displaying the name of the player in first place. On pressing that button, the operator is presented with buttons for the mobile cameras following the player in first place as well as the buttons for the fixed cameras at hole 18.

As described above, the operator is able to navigate through the hierarchy of destinations and select a specific destination device, and at each step of the navigation, the only buttons that are illuminated in green at high tally are buttons that will take the operator closer to selection of a destination device.

Thus, the control panel buttons have dual functions (navigate and status) and the current function can be indicated not only by the legend but also by color. In the example discussed above, when a button displays "sources" or "cameras" it is a navigate button, in that the legend communicates to the operator what will happen when the button is pressed, so pressing the button allows the operator to navigate a menu tree to arrive at the opportunity to select an attribute; and when a button displays, for example, VTR 1 it is a status button, in that by pressing the button the operator is able to select a value for an attribute: the source to which the destination will be connected when the "Take" button is pressed. In addition, the status display panel enables the operator to see at a glance the current status of the router.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A media router control panel, comprising:
 a network interface in communication with a media router control system comprising a media router connected to a plurality of audio or video inputs or outputs of a plurality of media devices, each of said media devices belonging to a category of one or more predetermined categories; and
 a plurality of relegendable buttons, each including within said relegendable button a display;
 wherein
 in an initial state, a display within a first button is configured to display a media destination legend,
 responsive to selection of the first button, the media router control panel is configured to transition to a second state in which the displays within the plurality of buttons are reconfigured to display the one or more predetermined categories, responsive to selection of a button corresponding to a first category of the one or more categories, the media router control panel is configured to transition to a third state in which the displays within the plurality of buttons are reconfigured to display media devices belonging to the first category, and responsive to selection of a button corresponding to a first media device of the media devices belonging to the first category, the media router control panel is configured to transition to a fourth state in which the network interface is configured to transmit an identification of the input of the first media device to the media router control system, wherein, in the fourth state, a display within a second button is configured to display a media source legend, responsive to selection of the second button, the media router control panel is configured to transition to a fifth state in which the displays within the plurality of buttons are reconfigured to display the one or more predetermined categories, responsive to selection of a button corresponding to a second category of the one or more categories, the media router control panel is configured to transition to a sixth state in which the displays within the plurality of buttons are reconfigured to display media devices belonging to the second category, and responsive to selection of a button corresponding to a second media device of the media devices belonging to the second category, the network interface is configured to transmit an identification of the output of the second media device to the media router control system, and a request to connect an audio or video output of the second media device to a corresponding audio or video input of the first media device, and the media router control panel is configured to transition to the initial state.

2. The media router control panel of claim 1, wherein receipt of the request to connect the audio or video output of the second media device to the corresponding audio or video input of the first media device causes the media router control system to connect an input port of a plurality of input ports of the media router control system connected to the audio or video output of the second media device to an output port of a plurality of output ports of the media router control system connected to the corresponding audio or video input of the first media device.

3. The media router control panel of claim 1, further comprising a processor maintaining an identification of the state of the media router control panel.

4. The media router control panel of claim 3, further comprising a database management system maintaining label data corresponding to the one or more predetermined categories and media devices belonging to each category, and wherein, responsive to transitioning to a new state, the processor is configured to retrieve label data from the database management system corresponding to the new state for display in the displays within the plurality of buttons, and update the displays within the plurality of buttons with the retrieved label data.

5. The media router control panel of claim 1, wherein the network interface is further configured to communicate with a processor of the media router control system maintaining an identification of the state of the media router control panel.

6. The media router control panel of claim 5, wherein the network interface is further configured to, for each transition between states:

transmit an identification of a selected button to the media router control system; and receive label data corresponding to the new state for display in the displays within the plurality of buttons; and wherein the media router control panel is configured to update the displays within the plurality of buttons with the received label data.

7. The media router control panel of claim 5, wherein the network interface is further configured to receive, from the media router control system, iterative requests for a status of each button of the plurality of relegendable buttons; and transmit, responsive to each request, an identification of a status of a corresponding button.

8. The media router control panel of claim 7, wherein the network interface is further configured to receive, from the media router control system, label data corresponding to a subsequent state for display in the displays within the plurality of buttons, transmitted responsive to transmission, by the network interface, of an identification of a status of a button different from a previously transmitted identification of the status of the button.

9. A method of controlling a media router control system, comprising:

detecting, by a processor of a media router control panel in communication via a network interface with a media router connected to a plurality of audio or video inputs or outputs of a plurality of media devices, each of said media devices belonging to a category of one or more predetermined categories, a press of a first button of a plurality of relegendable buttons of the media router control panel, the media router control panel in an initial state and a display of the first button configured to display a media destination legend;

responsive to detection of the press of the first button, reconfiguring displays of the plurality of relegendable buttons to display the one or more predetermined categories during transition to a second state of the media router control panel;

detecting, by the processor, a press of a second button of the plurality of relegendable buttons displaying, in the second state, a first category of the one or more predetermined categories;

responsive to detection of the press of the second button, reconfiguring displays of the plurality of relegendable buttons to display media devices belonging to the first category during transition to a third state of the media router control panel;

detecting, by the processor, a press of a third button of the plurality of relegendable buttons displaying, in the third state, a first media device of the media devices belonging to the first category;

responsive to detection of the press of the third button, transmitting an identification of the input of the first media device to the media router control system during transition to a fourth state of the media router control panel;

responsive to detection of the press of the third button, reconfiguring a display of a fourth button of the plurality of relegendable buttons to display a media source legend;

detecting, by the processor, a press of the fourth button;

responsive to detection of the press of the fourth button, reconfiguring displays of the plurality of relegendable buttons to display the one or more predetermined categories during transition to a fifth state of the media router control panel;

detecting, by the processor, a press of a fifth button of the plurality of relegendable buttons displaying, in the fifth state, a second category of the one or more predetermined categories;

responsive to detection of the press of the fifth button, reconfiguring displays of the plurality of relegendable buttons to display media devices belonging to the second category during transition to a sixth state of the media router control panel;

detecting, by the processor, a press of a sixth button of the plurality of relegendable buttons displaying, in the sixth state, a second media device of the media devices belonging to the second category; and responsive to detection of the press of the sixth button, transmitting an identification of the output of the second media device to the media router control system and a request to connect an audio or video output of the second media device to a corresponding audio or video input of the first media device, during transition to the initial state.

10. The method of claim 9, wherein receipt of the request to connect the audio or video output of the second media device to the corresponding audio or video input of the first media device causes the media router control system to connect an input port of a plurality of input ports of the media router control system connected to the audio or video output of the second media device to an output port of a plurality of output ports of the media router control system connected to the corresponding audio or video input of the first media device.

11. The method of claim 9, further comprising maintaining, by the processor, an identification of the state of the media router control panel.

12. The method of claim 11, further comprising:
maintaining, by a database management system of the media router control panel, label data corresponding to the one or more predetermined categories and media devices belonging to each category; and
responsive to transitioning to a new state, retrieving, by the processor, label data from the database management system corresponding to the new state for display in the displays of the plurality of buttons, and updating the displays within the plurality of buttons with the retrieved label data.

13. The method of claim 9, further comprising communicating, by the network interface, with a processor of the media router control system maintaining an identification of the state of the media router control panel.

14. The method of claim 13, further comprising, for each transition between states:
transmitting, by the network interface, an identification of a selected button to the media router control system;
receiving, by the network interface, label data corresponding to the new state for display in the displays within the plurality of buttons; and
updating, by the processor, the displays within the plurality of buttons with the received label data.

15. The method of claim 13, further comprising receiving, by the network interface from the media router control system, iterative requests for a status of each button of the plurality of relegendable buttons; and transmitting, responsive to each request, an identification of a status of a corresponding button.

16. The method of claim 15, further comprising receiving, by the network interface from the media router control system, label data corresponding to a subsequent state for display in the displays within the plurality of buttons, transmitted responsive to transmission, by the network interface, of an identification of a status of a button different from a previously transmitted identification of the status of the button.

* * * * *